L. MANDEL.
FILM ROLL HOLDER.
APPLICATION FILED MAY 18, 1914.
1,137,771.
Patented May 4, 1915.
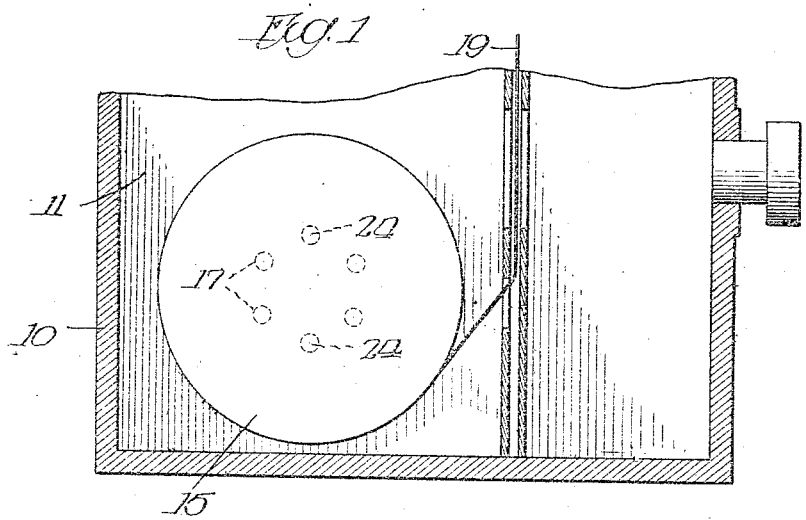
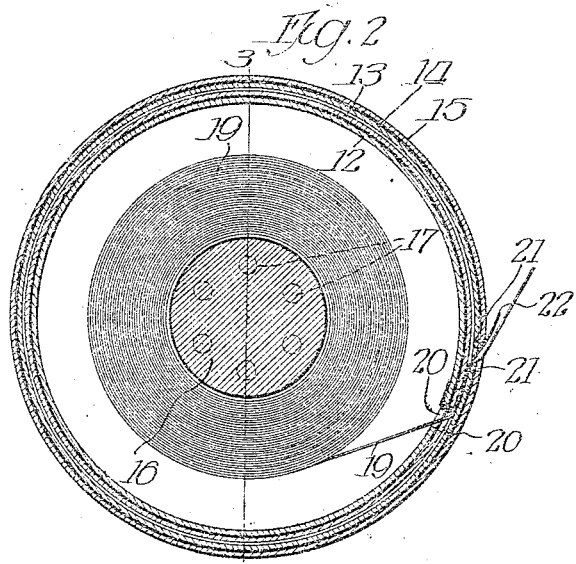
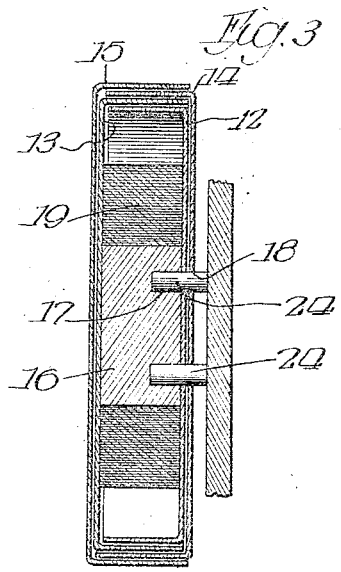
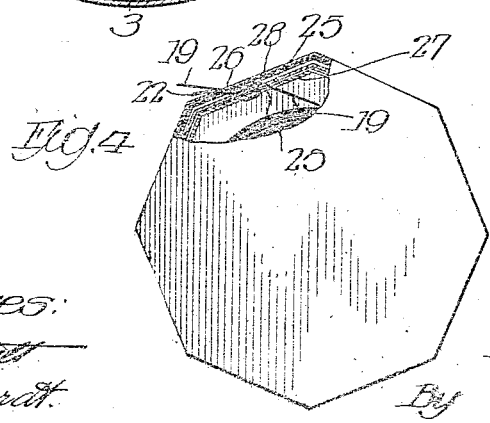
Witnesses:
S. K. Bartt
P. Burkhardt
Inventor
Louis Mandel
By J. H. Jochum Jr.
Atty.

UNITED STATES PATENT OFFICE.

LOUIS HANDEL, OF CHICAGO, ILLINOIS.

FILM-ROLL HOLDER.

1,137,771.

Specification of Letters Patent.

Patented May 4, 1915.

Application filed May 13, 1914. Serial No. 838,184.

*To all whom it may concern:*

Be it known that I, LOUIS HANDEL, a citizen of the United States, residing at Chicago, in the county of Cook and State of Illinois, have invented certain new and useful Improvements in Film-Roll Holders, of which the following is a specification.

This invention relates to improvements in film roll holders, or film pack for holding flexible negative films when used in ribbon form, whereby the film may be placed in the camera in daylight and from which holder the film may be fed as needed, when the camera is being used for photographic purposes.

A further object is to provide an improved holder of this character having means for protecting the film as it is drawn out of the holder, and means for holding the holder to prevent rotation while the film is being drawn therefrom.

A further object is to provide an improved device of this character which will be simple, durable, light, compact and cheap in construction, and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating the invention, and in which—

Figure 1 is a vertical sectional view of a portion of a camera having a film roll holder therein constructed in accordance with the principles of this invention. Fig. 2 is a vertical sectional view of one form of film holder. Fig. 3 is a sectional view taken on line 3—3, Fig. 2. Fig. 4 is a view similar to Fig. 2, of another form of film roll holder.

Referring more particularly to the drawing and in the present exemplification of this invention, the numeral 10 designates generally a camera having a chamber 11 therein, in which the film roll holder is placed.

In the form of the holder shown in Figs. 2 and 3, the holder comprises a plurality of pairs of nested cases, the inner case comprising opposed sections 12, 13 and the outer case comprising opposed sections 14, 15. These cases as shown in Figs. 2 and 3 are circular in cross section and secured within the inner case is a body portion 16 which is of a diameter somewhat smaller than the inner case and is preferably secured to one of the sections of the case to be removed therewith. The body portion 16 is provided with recesses 17 opening through the side of the case and the section 14 of the outer case is also provided with a series of apertures 18 adapted to be brought into register with the recesses 17. The film 19 is in the form of a flexible sheet of celluloid and is wound about the body portion 16 and the free end of the film passes through registering apertures 21 in the side of the case 10 and 20 so that as the film is drawn out or unwound it will slide around the core. The outer casing comprising sections 14, 15 is also provided with a series of registering apertures 20 through which the free end of the film passes, and the apertures 20, 21 are placed out of register with each other so as to create a friction upon the film. The outer casing is of a size slightly larger than the inner case so as to permit the film to pass between the walls of the casings and will have a friction created thereon by reason of the casing, the amount of the friction being determined by the position of the apertures 20, 21 with respect to each other. In order to protect the film, or rather the sensitized face thereof, where it passes over the edges of the openings 20, 21, a shield 22 in the form of a soft flexible material is provided. This shield is secured by its extremities to the inner face of one of the sections of the inner casing and passes through the openings 20, 21 to the outside of the outer casing and beneath the film, so that the film does not engage and pass therewith.

In use the holder is placed in the chamber 11 of the camera and the inner and outer casings have been properly placed so as to have the desired relation one to the other of apertures or which is a means in the position to register with the openings and in this position the holder may be retained in the chamber and held there by means of projection 23 adapted to pass through the chamber which holds the apertures and means. They are only held the holder and the case 16 against rotation to maintain the apertures and opening with respect to each other. The shield permits free passage of the film and the shield so that an injury to the film will not occur.

In the form of the invention shown in

Fig. 4, and in order to maintain the openings 25, 26 in the sections 27, 28 out of register, the casing sections 27, 28 are angular in cross section, here shown as octagonal, although any shape may be employed. In lieu of the apertures 18 and the recesses 17, to hold the sections and the holder against rotation, the entire holder may be placed in a chamber which is also octagonal in configuration or which is of a shape to conform to the contour of the holder. With this improved construction it will be manifest that the film holder may be placed in the camera in the daylight as the holder or pack is in an assembled condition ready to be so placed, when it is received by the operator and by being thus arranged, the film may be fed from the holder in any desired manner thereby enabling the operator to employ a considerable amount of film while at the same time it will be stored in a compact space.

Obviously many changes may be made in the details of construction and the arrangement of the parts without departing from the spirit of this invention.

What is claimed as new is:—

1. A photographic film roll holder comprising nested pairs of opposed cases, for holding the film, a non-rotatable core in one of the cases for the film, the sections of each case having registering slots through which the film passes, and the slots of one pair of cases being disposed out of register with the slots of the other case, and a protecting element adjacent the slots for protecting the film as it passes through the slots.

2. A photographic film roll holder comprising nested pairs of opposed cases, for holding the film, the sections of each case having registering slots through which the film passes, and the slots of one pair of cases being disposed out of register with the slots of the other case, and a flexible protecting element for the film, said element passing through the slots and with which element the film has engagement.

3. A photographic film roll holder comprising opposed telescoping sections having an opening through which the film passes, provisions for maintaining the holder against rotation while the film is being drawn therefrom, a non-rotatable core about which the film slides, and a protecting shield for the film while it passes through the said opening.

4. As an article of manufacture a film roll holder comprising a closed casing for holding the film, said casing having an opening through the wall thereof through which the film passes, a second closed casing in which the first recited casing is housed, the second casing having an opening through the wall through which the film passes, said openings being out of register to create friction on the film, means for maintaining them out of register and a flexible element extending through the openings from the inside of the casings to protect the film where it passes over the edges of said openings.

5. A photographic film roll holder comprising nested pairs of opposed cases for holding the film, the sections of each case having registering slots through which the film passes, the slots of the sections of one case being arranged out of register with the slots of the sections of the other case, a core arranged in the innermost casing and which core is encircled by the film, a portion of the film intermediate the slots passing between and frictionally held by the adjacent walls of the casing, and a protecting element for the film adjacent the slots.

6. A photographic film roll holder embodying a casing comprising opposed telescoping sections, the said sections having registering slots through which the film passes, and a protector for the film as it passes through the slots, said protector being secured within the casing and adjacent the slots.

7. A photographic film roll holder embodying a casing comprising opposed telescoping sections, the said sections having registering slots through which the film passes, and a flexible protector for the film as it passes through the slots, said protector being secured within the casing and adjacent the slots, a portion of the protector extending through the slots.

8. A photographic film roll holder embodying a casing comprising opposed telescoping sections, said sections having registering slots through which the film passes, a protector for the film as it passes through the slots, said protector being secured within the casing and adjacent the slots, and a core within the casing upon which the film is wound.

In testimony whereof I have signed my name to this specification, in the presence of two subscribing witnesses, on this 12th day of May A. D. 1914.

LOUIS MANDEL.

Witnesses:
 FRANK N. REED,
 J. H. JOCHUM, Jr.